United States Patent [19]
Megargle et al.

[11] Patent Number: 5,937,571
[45] Date of Patent: Aug. 17, 1999

[54] TERMITE BAIT STATION

[75] Inventors: William Francis Megargle, Beverly; John Ernest Milliner, Haddonfield; Michael Dea Andis, Saddle River, all of N.J.; P. David Simcox, Washington Crossing, Pa.; James Bruce Ballard, Medford, N.J.

[73] Assignee: FMC Corporation, Del.

[21] Appl. No.: 08/785,566

[22] Filed: Jan. 21, 1997

Related U.S. Application Data

[63] Continuation of application No. 08/420,275, Apr. 11, 1995, abandoned.

[51] Int. Cl.[6] .................................................. A01M 1/20
[52] U.S. Cl. .............................. 43/131; 43/124; 43/132.1
[58] Field of Search ........................... 43/124, 131, 132.1

[56] References Cited

U.S. PATENT DOCUMENTS

| | | | |
|---|---|---|---|
| 4,823,506 | 4/1989 | Demarest et al. | 43/131 |
| 4,921,696 | 5/1990 | Vander Meer et al. | 424/84 |
| 4,958,456 | 9/1990 | Chaudoin et al. | 43/124 |
| 5,042,194 | 8/1991 | Cohen | 43/131 |
| 5,152,992 | 10/1992 | Kandathil et al. | 424/84 |
| 5,177,107 | 1/1993 | Meer at al. | 514/553 |
| 5,238,681 | 8/1993 | Chang et al. | 43/131 |
| 5,329,726 | 7/1994 | Thorne et al. | 43/124 |
| 5,555,672 | 9/1996 | Thorne et al. | 43/124 |
| 5,564,222 | 10/1996 | Brody | 43/124 |

FOREIGN PATENT DOCUMENTS 9323998  12/1993  WIPO.

OTHER PUBLICATIONS

Termite Biology & Bait–block Method of Control, by Raimon L. Beard, Bulletin 748, The Connecticut Agricultural Experiment Station, New Haven, Nov. 1974.

*Primary Examiner*—Michael J. Carone
*Assistant Examiner*—Darren Ark
*Attorney, Agent, or Firm*—Donald J. Silvert; Joseph Lucci

[57] ABSTRACT

The invention provides a method and apparatus for controlling termites. The invention provides a tamper resistant bait station, which uses a cellulose bait impregnated with a slow acting toxicant and readily allows entry of termite.

10 Claims, 6 Drawing Sheets

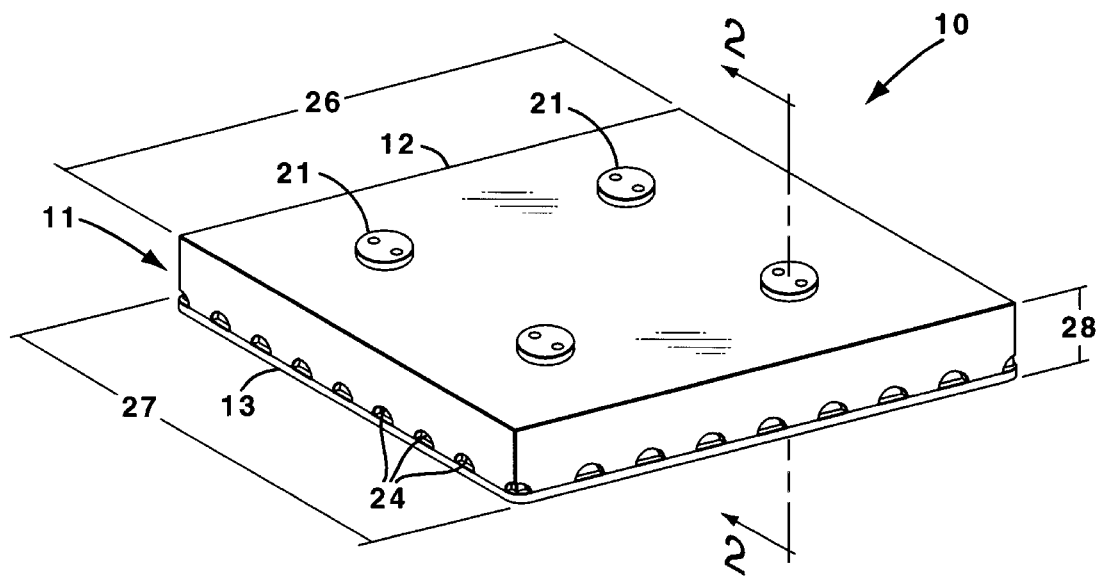
FIG_1
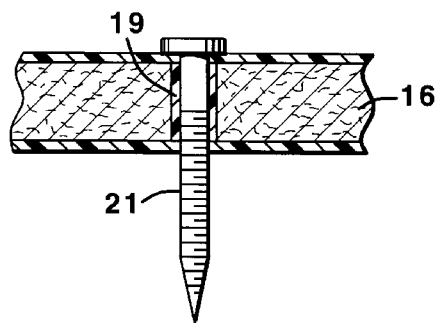
FIG_2
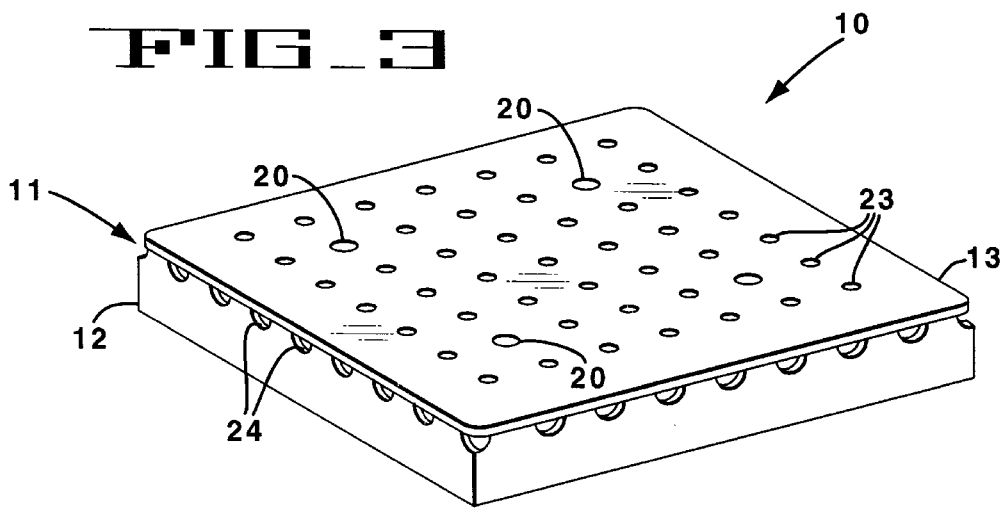
FIG_3

FIG_4
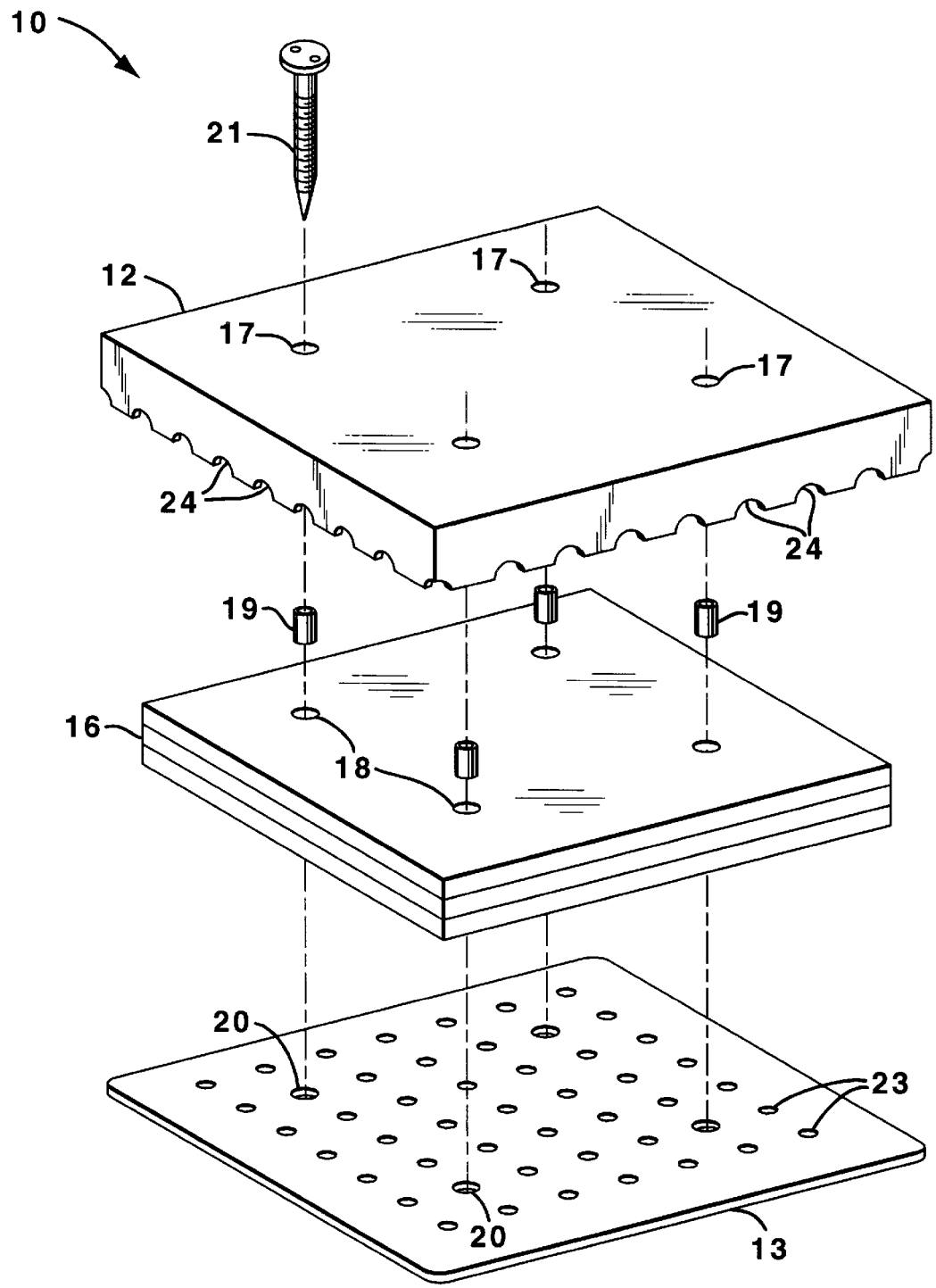

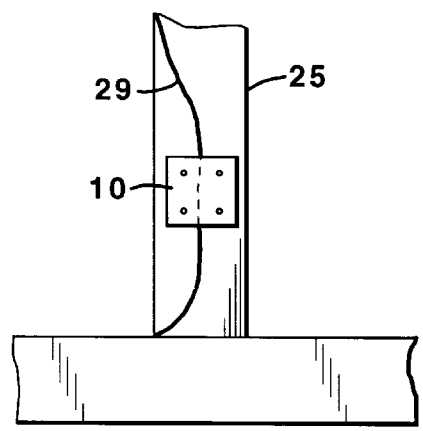
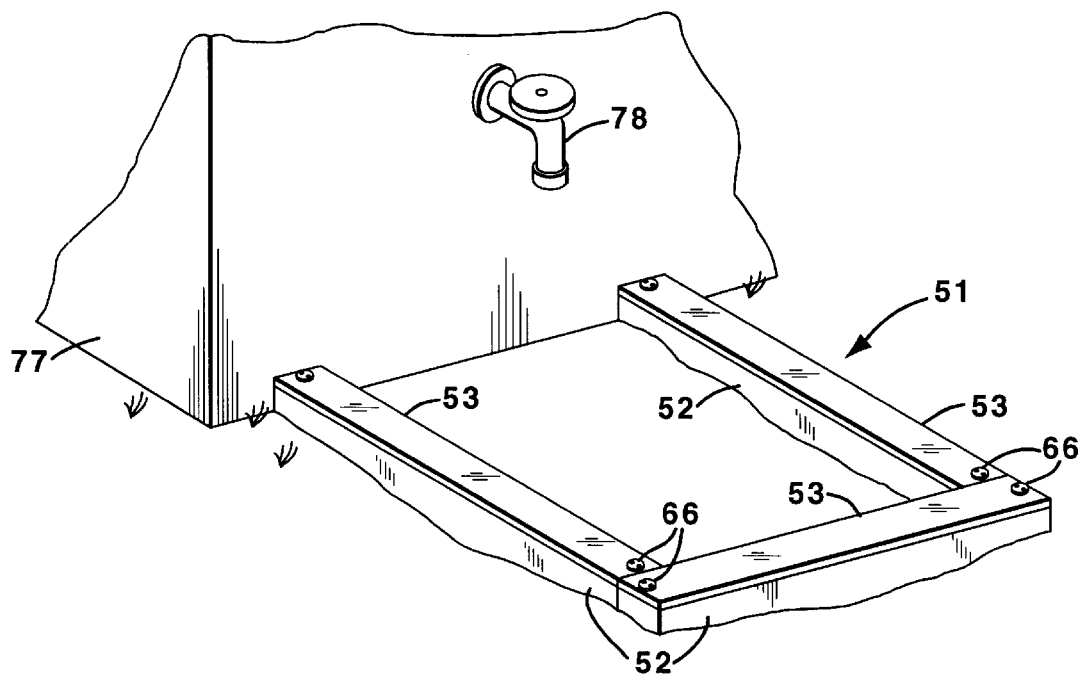

FIG_6
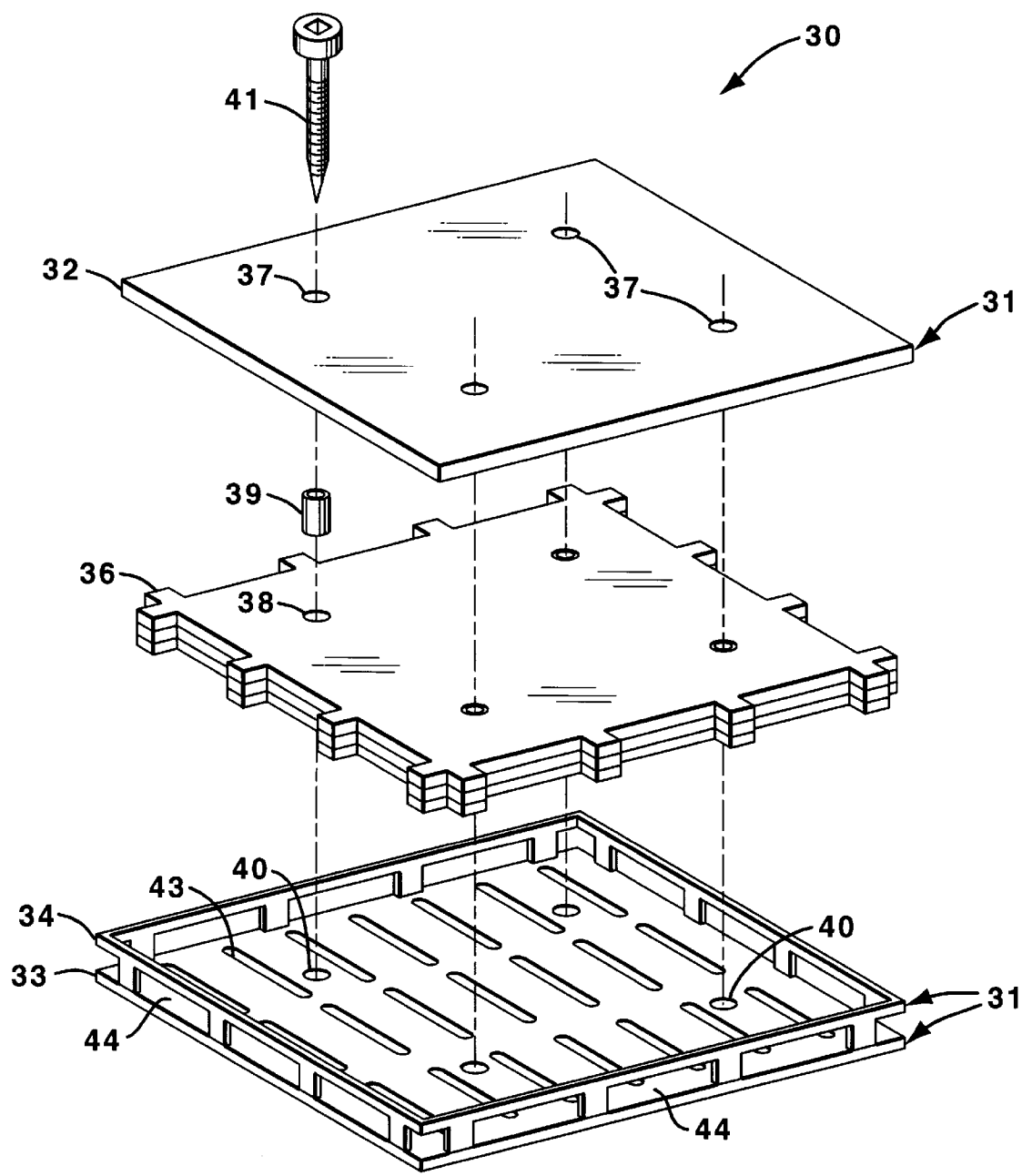

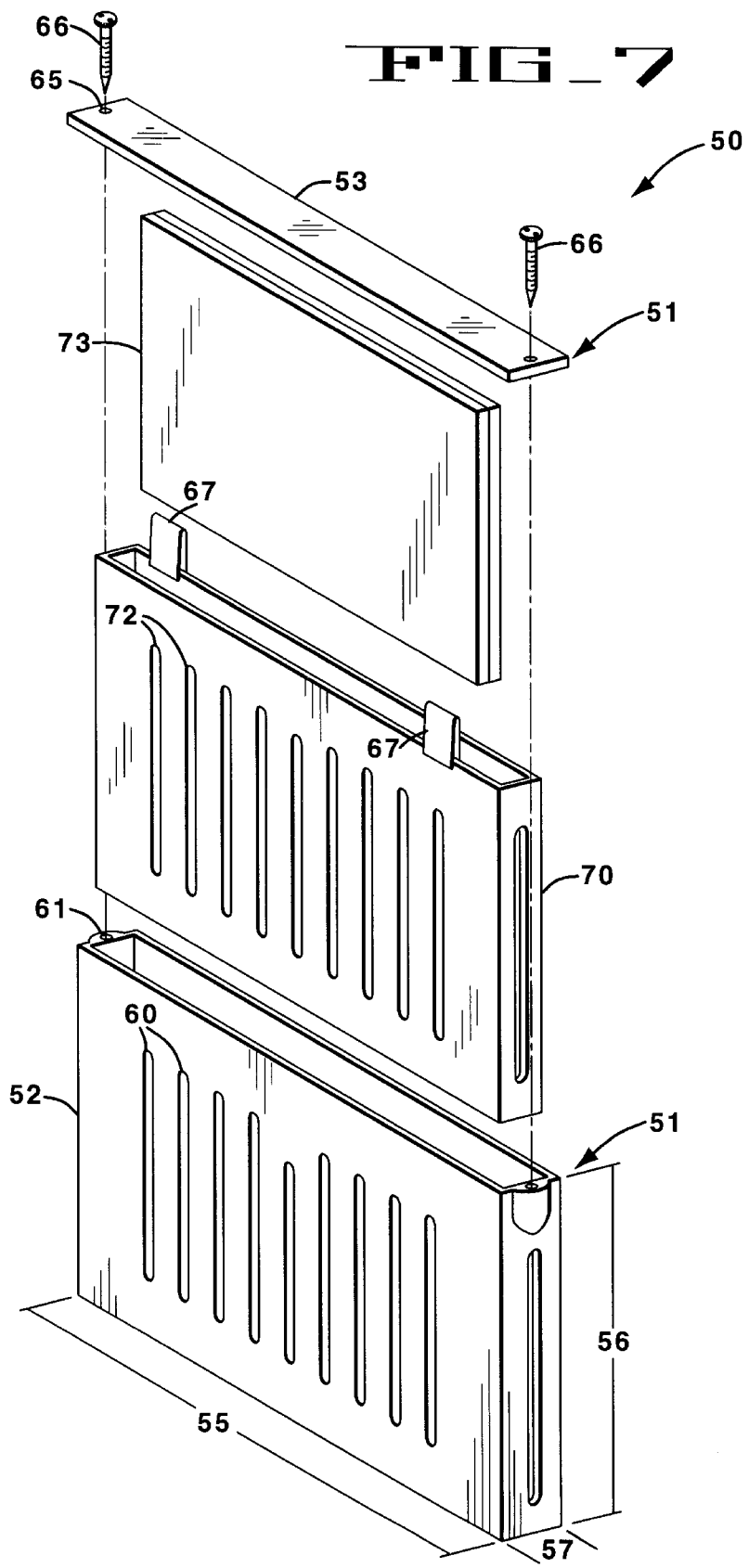

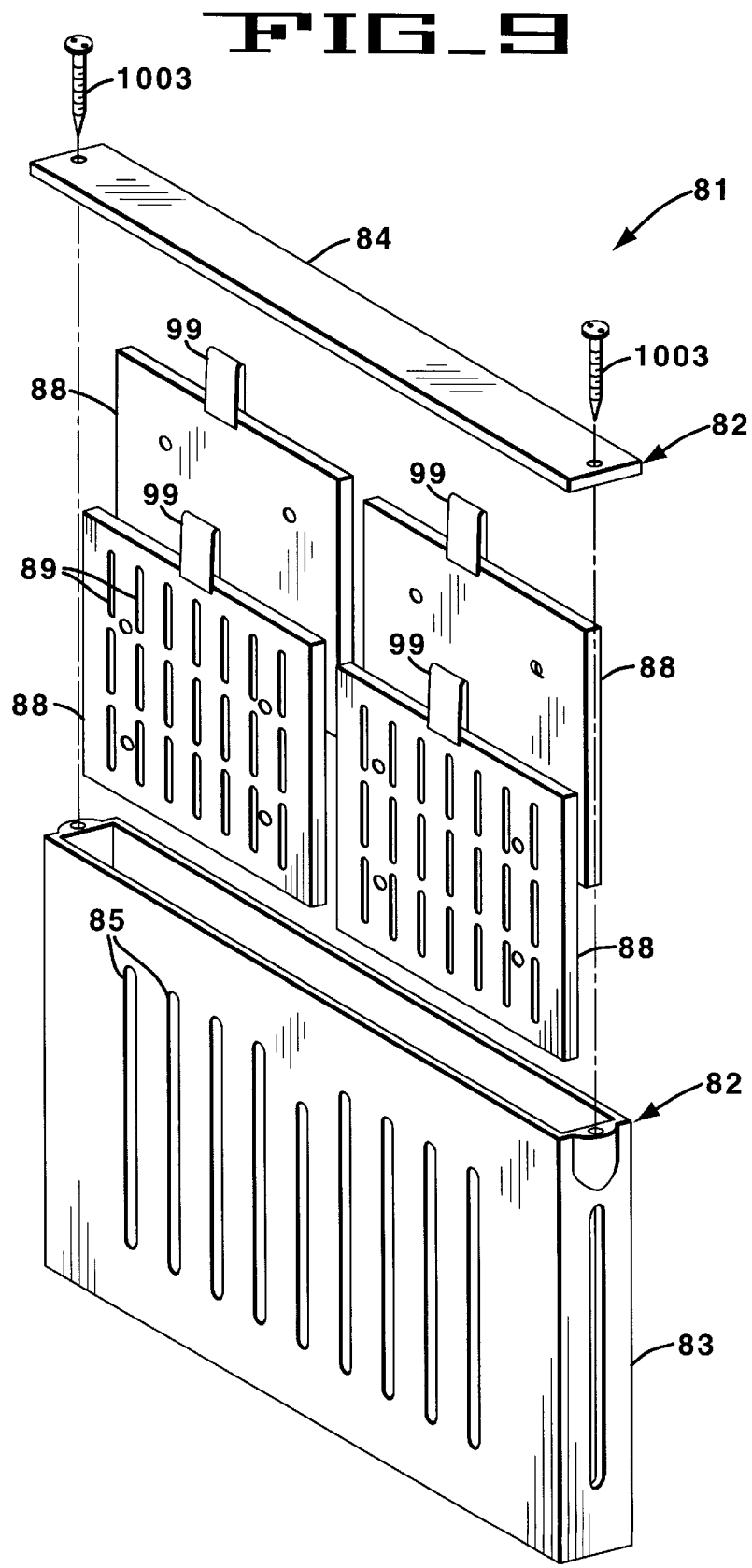

TERMITE BAIT STATION

This application is a continuation of application Ser. No. 08/420,275 filed Apr. 11, 1995 now abandoned.

The present invention relates generally to the control of termites and other social insects. In particular, the present invention relates to the control of such insects using an apparatus containing bait impregnated with a slow acting toxicant. For a discussion of social insects, see generally U.S. Pat. No. 5,152,992. That patent is incorporated by reference herein to the extent it discusses social insects and their habits.

In the prior art, various techniques of spraying fast acting insecticides in a structure are used to eliminate social insects such as termites in the structure. For eliminating social insects in the ground, tubular instruments with a small surface area to volume ratio were used.

It is an object of the invention to provide an apparatus and method for eliminating social insects such as termites in a structure.

It is another object of the invention to provide an apparatus and method for eliminating social insects in the ground.

The invention provides a method and apparatus for mounting within or on a structure to eliminate social insects such as termites. The invention uses a cellulose bait impregnated with a slow acting toxicant held in a tamper resistant container, which is placed within or mounted on the structure. The tamper resistant container, makes the container safe to use around children and still allows termite entry. Another embodiment of the invention provides an apparatus with a large surface area to intercept social insects in the ground moving in a generally horizontal direction.

FIG. 1 is a perspective view of a preferred embodiment of an inventive bait station.

FIG. 2 is a sectional view of the bait station in FIG. 1 along lines 2—2.

FIG. 3 is a perspective view of the bait station in FIG. 1, in a flipped position.

FIG. 4 is an exploded view of the bait station in FIG. 1.

FIG. 5 is a schematic view of the bait station in FIG. 1 mounted in a structure.

FIG. 6 is an exploded view of another preferred embodiment of a bait station.

FIG. 7 is an exploded view of a preferred embodiment of a outdoor station.

FIG. 8 is a schematic view of the use of the embodiment illustrated in FIG. 7.

FIG. 9 is an exploded view of another preferred embodiment of outdoor station.

In FIGS. 1, 2, 3, 4 a bait station 10 has an outer cover 11, comprising an opaque plastic top cover 12 and a transparent plastic bottom cover 13. The outer cover 11, forms a flat box shape, with the top cover 12 forming five sides of the flat box and the bottom cover 13 forming one side of the flat box. One side of the top cover 12 and the bottom cover 13 form the sides of the flat box with the greatest area. Between the top cover 12 and the bottom cover 13 is a piece of a cardboard substrate 16 impregnated with a slow acting toxicant such as sulfluramid. In the specification and claims, a slow acting toxicant is defined as a toxicant that requires longer than 24 hours and less than 2160 hours after ingestion of a termiticidally effective amount to kill a termite. The cardboard 16 is surrounded by the top cover 12 and the bottom cover 13. The top cover 12 is welded to the bottom cover 13 forming the tamper resistant outer cover 11.

The top cover 12 has a plurality of top cover screw holes 17. The cardboard 16 has a plurality of cardboard screw holes 18, which mate with the top cover screw holes 17. A plurality of spacers 19 are provided, with a spacer 19 in each cardboard screw hole 18. The bottom cover 13 has a plurality of bottom cover screw holes 20, which mate with the cardboard screw holes 18. A plurality of screws 21 are provided with a screw 21 passing through a top cover screw hole 17 and its mating cardboard screw hole 18, and its mating bottom cover screw hole 20. As the screw 21 passes through the cardboard screw hole 18 it also passes through a spacer 19. The screws 21 provide a means for mounting the bait station 10 to a structure. The heads of the screws 21 are specially designed to make the bait station 10 tamper resistant.

The bottom cover 13 has a plurality of bottom cover apertures 23 in the shape of circles. Side apertures 24 are formed at the junction where the top cover 12 and the bottom cover 13 meet. The bottom cover apertures 23 and the side apertures 24 are smaller than the diameter of a child's finger, to prevent children from touching the cardboard 16, thus helping to make the bait station tamper resistant.

The outer cover 11 has a length 26, a width 27, and a thickness 28. To provide a desirable surface area to volume ratio both the length 26 and width 27 are at least five times greater than the thickness 28 of the outer cover 11. To utilize this desirable surface area to volume ratio, the apertures 23, 24 extend substantially along the length and width of the outer cover 11.

In operation, an active termite tube in a structure is located. The bait station 10 is mounted on the structure using the screws 21, so that the termite tube openings align with the side apertures 24. FIG. 5 is a schematic view of a bait station 10 mounted on a structure 25. A termite tube 29 is located. Part of the termite tube is broken away to allow alignment of the side apertures 24 of the bait station 10 with the termite tube 29. The termites will rebuild the termite tube into the bait station 10. Termites passing through the termite tube pass through the side apertures to the cardboard. The termites eat the cardboard, taking in the slow acting toxicant. The termites go back to the colony before the slow acting toxicant kills the termite, and shares the cardboard with the rest of the colony. This provides the slow acting toxicant to the colony, thus killing the whole colony. Therefore the invention provides a means for controlling a termite colony. The controlling of a termite colony means any of the following: the killing of the whole colony, or stopping the destruction caused by the colony, or substantially eliminating the colony.

In an alternative method of operation, if termites are under the floor boards, a bait station 10 may be placed on the termites with the bottom cover 13 on the bottom. Termites would then enter the bait station 10 through the bottom cover apertures 23. The termites again ingest the cardboard and the slow acting toxicant, taking the toxicant back to the colony.

The transparent bottom allows the cardboard 16 to be viewed when the bait stations are removed from the structure. Viewing the cardboard 16 allows the determination of the effectiveness of the location of the bait station 10, and whether the colony has been eradicated, and whether the bait station 10 or the cardboard substrate 16 needs replacing.

In FIG. 6 a bait station 30 has an outer cover 31, comprising a tinted transparent plastic top cover 32, an opaque plastic bottom cover 33, and an opaque side cage 34 between the top cover 32 and bottom cover 33 and around the outer edges of the top cover 32 and the bottom cover 33. The outer cover 31, forms a flat box shape, with the top cover 32 forming a side of the flat box with the greatest area, and the bottom cover 33 forming the other side of the flat box with the greatest area, and the side cage 34 forming the four sides of the flat box with the smallest areas. Between the top cover 32 and the bottom cover 33 and within the perimeter formed by the side cage 34 is a piece of cardboard 36 impregnated with a slow acting toxicant such as sulfluramid. The side cage 34 is welded to the bottom cover 33.

The top cover 32 has a plurality of top cover screw holes 37. The cardboard 36 has a plurality of cardboard screw holes 38, which mate with the top cover screw holes 37. A plurality of spacers 39 are provided, with a spacer 39 in each cardboard screw hole 38. The bottom cover 33 has a plurality of bottom cover screw holes 40, which mate with the cardboard screw holes 38. A plurality of screws 41 are provided with a screw 41 passing through a top cover screw hole 37 and its mating cardboard screw hole 38, and its mating bottom cover screw hole 40. As the screw 41 passes through the cardboard screw hole 38 it also passes through a spacer 39. The screws 41 provide a means for mounting the bait station 30 to a structure. The screws 41 also secure the top cover 32 to the bottom cover 33 so that the edges of the top cover 32 press against the side cage 34 forming the outer cover 31 and making the outer cover 31 tamper resistant. The heads of the screws 41 are square socket heads.

The bottom cover 33 has a plurality of bottom cover apertures 43 in the shape of slots. Side apertures 44 are formed at the junction where the side cage 34 and the bottom cover 33 meet. The bottom cover apertures 43 and the side apertures 44 are small enough to prevent children from touching the cardboard 16, thus helping to make the bait station 30 tamper resistant.

The operation of this bait station 30 is the same as the bait station 10 above. The tinted transparent plastic top cover 32 allows inspection of the cardboard 36 without removing the bait station 30.

Another method of operation would provide screws 41 that are just long enough to reach from the top cover screw holes 37 to the bottom cover screw holes 40. As the user mounts the bait station 30, a screw 41 is removed and replaced with a longer screw. This allows longer screws 41 to be used only where needed for mounting the bait station 41.

The cardboard 16, 36 in these embodiments may be replaced with other cellulose baits that are ingested by termites, such as paper or wood. The slow acting toxicant may be any toxicant that requires more than 24 hours and less than 6 months after ingestion of a termiticidally effective amount to kill a termite. Slow acting toxicants useful in the present invention include, but are not limited to: boric acid/borate, hydramethylnon, macrolide antibiotics (e.g., spinosyn A and/or D, abamectin and milbemycin), insect growth regulators such as molting disrupters or juvenile hormone agonists/antagonists, biological agents (i.e., living organisms or their reproductive stages), protozoacides, known termiticides, slow acting poisons or mixtures thereof. Specific examples of molting disrupters include chitin inhibitors, particularly benzoylureas such as hexaflumuron. A preferred type of toxicant is the class of compounds described in U.S. Pat. Nos. 4,921,696 and 5,177,107. Those patents are hereby incorporated by reference. A particularly preferred toxicant of this class is sulfluramid. Other particularly preferred toxicants are abamectin, hydramethylnon, hexaflumuron. A preferred slow acting toxicant would be a toxicant that requires longer than 96 hours and less than 720 hours after ingestion of a termiticidally effective amount of toxicant to kill a termite. Other means may be used to attach the bait station to a structure such as tape or adhesive glue. In these embodiments to obtain a desired surface area to volume ratio, the outer container has a length, width and thickness, wherein the length and width of the outer container are both five times greater than the thickness of the outer container, and wherein the apertures extend along the length or width of the containers.

The amount of toxicant needed to control termites will vary, depending on the particular toxicant used, but in general an amount between about 1 and about 5,000 parts per million (ppm) of toxicant to bait will be utilized in the cellulose bait. For example, if sulfluramid is the toxicant, an amount between about 10 and about 200 ppm may be used, preferably between about 50 and about 100 ppm, and if abamectin is the toxicant, an amount between about 10 and about 200 ppm may be used, preferably between about 50 and about 100 ppm.

In a field test, a cardboard substrate was impregnated with sulfluramid at 100 ppm. and placed in an outer cover with apertures. The apertures were aligned with at least one active termite tube in a structure and the outer cover was mounted on the structure. In 13 structures control was obtained on an average of 72 days.

In FIG. 7 a outdoor station 50 has an outer box 51, comprising the body 52, and a top cover 53. The outer box 51 has a length 55, width 56, and thickness 57, wherein the length 55 is at least ten times the thickness 57, and wherein the width 56 is at least five times the thickness 57. The body 52 has a plurality of apertures 60 which extend along the side of the body 52 defined by the length 55 and width 56 of the outer box 51. The body 52 has a plurality of screw holes 61. The top cover 53, which extends along the length 55 and thickness 57 of the outer box 51 has a plurality of screw holes 65, which mate with the screw holes 61 of the body 52. A plurality of screws 66 are provided to pass through the screw holes 65 of the top cover 53 and screw into the screw holes 61 of the body 52.

A bait holder 70 also has a box shape, and is small enough to fit into the outer box 51. The bait holder 70 has a plurality of apertures 72. Cellulose bait 73 impregnated with a slow acting toxicant is placed in the bait holder 70. The bait holder 70 has a plurality of foldable tabs 67 to allow easier removal of the bait holder 70 from the body 52. Other means may be provided to facilitate the bait holder 70 from the body 52.

FIG. 8 is a schematic illustration a plurality of the outdoor stations in operation. Adjacent to a structure 77, there may be areas that have a higher chance of attracting termites, such as near a water source such as a faucet 78. A U-shaped trench is made around the area of the faucet 78 and three bodies 52 of outer boxes 51 are placed in the trenches. A bait holder 70 (FIG. 7) is then placed in each body 52 of an outer box 51. A top cover 53 is then secured to each body 52 by the screws 66. On a periodic basis, possibly every three months, the screws 66 are removed, the bait holder 70 is also removed and inspected. If the cellulose bait 73 is intact, the bait holder 70 is put back in the body 52 and the top cover 53 is resecured. If the cellulose bait 73 needs replacing, a new bait holder 70 with new cellulose bait 73 is placed in the body 52. The periodic inspection allows the monitoring for termites.

As in the previous embodiments, the slow acting toxicant in the cellulose bait 73 allows for the control of an entire colony. The high surface area to volume ratio, due to the ratio between the length 55, width 56, and thickness 57 allows for a large surface area which protects against termites.

In another method of operation, the outer box 51 may be laid flat on the ground and covered with mulch.

FIG. 9 is an exploded view of another outdoor station 81. The outdoor station 81 has an outer box 82 with a body 83 and top cover 84. The body 83 has a plurality of apertures 85. In this embodiment four bait stations 88, such as the bait station 30 shown in FIG. 6 are placed in the outer box 82 to serve as bait holders and bait. The bait stations 88 in this embodiment are identical to the bait stations 30 of the embodiment shown in FIG. 6. The shorter screws 41 are used for this purpose. Foldable tabs 99 made of tape are placed on the bait stations 88 to allow easy removal of the bait stations 88. The bait stations 88 are placed so that the apertures 89 on the bottom of the bait stations 88 face outward towards the apertures in the body 83. Securing screws 1003 are supplied.

While preferred embodiments of the present invention have been shown and described herein, it will be appreciated that various changes and modifications may be made therein without departing from the spirit of the invention as defined by the scope of the appended claims.

What is claimed is:

1. An apparatus for controlling termites in a structure with a known location for active termite activity, comprising:
    a cellulose substrate impregnated with a slow acting toxicant:
    an outer cover surrounding the cellulose substrate, wherein the outer cover has a plurality of apertures, wherein a portion of the outer cover is transparent, wherein the outer cover has a length. width, and thickness, and wherein the length and width of the outer cover are both at least five times the thickness of the outer cover, wherein some of the plurality of apertures are through edges of the outer cover; and
    means for mounting the outer cover on the structure at the known location for active termite activity, wherein the means for mounting is connected to the outer cover.

2. The apparatus, as claimed in claim 1, wherein the means for mounting the outer cover comprises a plurality of screws, passing through the outer cover.

3. The apparatus, as claimed in claim 1, wherein the cellulose substrate is a flat piece of cardboard.

4. The apparatus, as claimed in claim 1, wherein the slow acting toxicant kills a termite in a time period between 96 hours and 720 hours after ingestion of a termiticidally effective amount of the toxicant by the termite.

5. The apparatus of claim 1 wherein said substrate is positioned within said cover to permit both ingress of a termite through a first aperture located on one side of said outer cover and egress of said termite through a second aperture located on an opposite side of said outer cover.

6. The apparatus of claim 1 wherein said some of the plurality of apertures are positioned at edges of the outer cover.

7. A method for controlling termites in a structure with a known location for active termite activity, comprising the steps of:
    locating an active termite tube in the structure; and
    placing an apparatus for controlling termites in a structure with a known location for active termite activity, comprising: a cellulose substrate impregnated with a slow acting toxicant; an outer cover surrounding the cellulose substrate, wherein the outer cover has a plurality of apertures; and means for mounting the outer cover on the structure at the known location for active termite activity, wherein the means for mounting is connected to the outer cover, adjacent to the active termite tube, wherein the step of placing an apparatus, comprises the steps of:
    removing part of the active termite tube at a location creating a first opening and a second opening in the termite tube; and
    placing the apparatus for controlling termites in the location of the removed part of the termite tube and aligning a first aperture of the plurality of apertures with the first opening in the active termite tube and aligning a second aperture of the plurality of apertures with the second opening in the active termite tube; and
    mounting the outer cover on a wall of the structure.

8. The method, as claimed in claim 5, wherein the first aperture of the plurality of apertures is through an edge of the outer cover.

9. The method of claim 7 wherein said substrate is positioned within said cover to permit both ingress of a termite through a first aperture located on one side of said outer cover and egress of said termite through a second aperture located on an opposite side of said outer cover.

10. The method of claim 7 wherein some of said plurality of apertures are positioned at edges of the outer cover.

* * * * *